April 15, 1952 E. A. ROCKWELL 2,593,055
CYLINDER PISTON STRUCTURE

Original Filed June 4, 1943 3 Sheets-Sheet 1

INVENTOR
*Edward A. Rockwell*
BY
*Arthur Wright*
ATTORNEY

April 15, 1952 E. A. ROCKWELL 2,593,055
CYLINDER PISTON STRUCTURE
Original Filed June 4, 1943 3 Sheets-Sheet 2
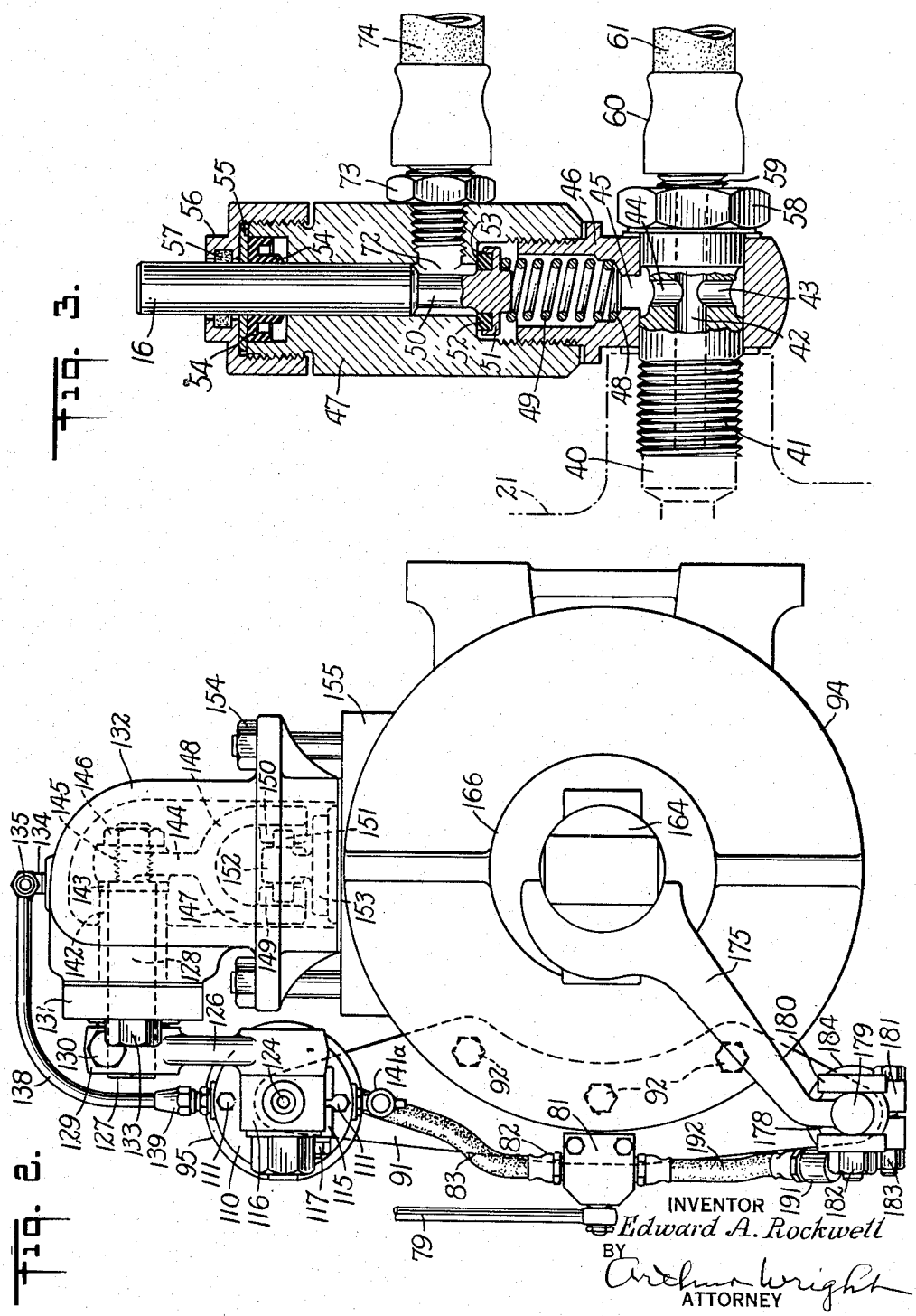
INVENTOR
Edward A. Rockwell
BY
ATTORNEY

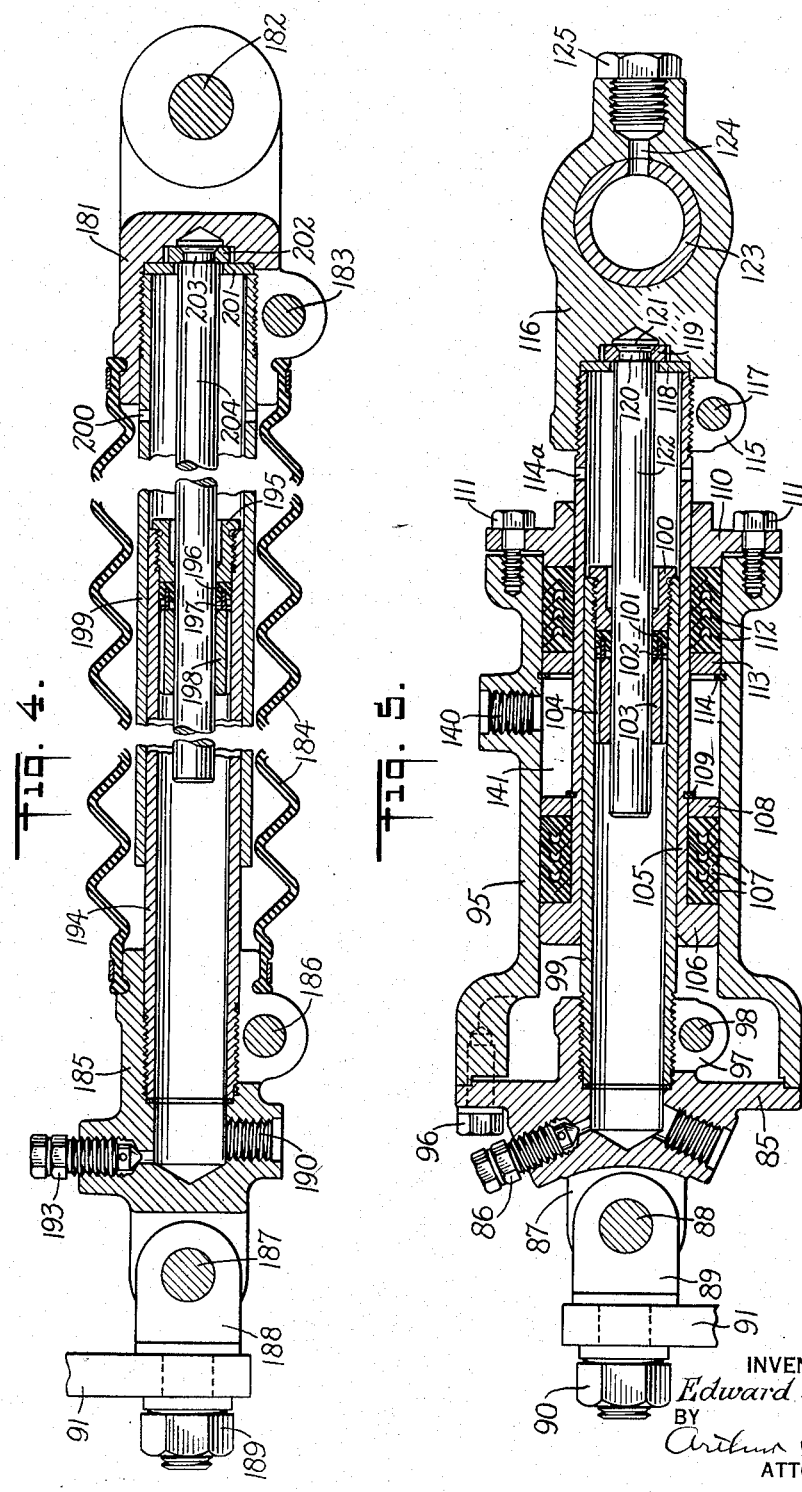

Patented Apr. 15, 1952

2,593,055

UNITED STATES PATENT OFFICE 2,593,055

CYLINDER PISTON STRUCTURE

Edward A. Rockwell, Cleveland, Ohio

Original application June 4, 1943, Serial No. 489,712, now Patent No. 2,448,465, dated August 31, 1948. Divided and this application January 24, 1945, Serial No. 574,321

11 Claims. (Cl. 60—54.6)

My invention relates particularly to an apparatus embodying a hydraulic cylinder and piston which may be used for effectively coordinating the travel of the controlling and controlled elements of a hydraulic system.

This application is a division of my copending application on "Pressure Fluid Follow-up Servomotor," Serial No. 489,712, filed June 4, 1943, now Patent No. 2,448,465.

The object of my invention is to provide a cylinder and piston structure of an advantageous character whereby hydraulically coordinated movement may be obtained in any desred apparatus. Another object is to provide a cylinder construction of this character involving a minimum of friction. Another object is to provide a piston head having a self-adjusting connection with the cylinder. Further objects of my invention will appear from the detailed description of the same hereinafter.

While my invention is capable of being carried out in many different ways, for the purpose of illustration I have shown only certain forms of my invention in the accompanying drawings, in which—

Fig. 2 is an end elevation of the same;

Fig. 3 is a vertical section of the valve used for delivering the hydraulic liquid under pressure to the controlling mechanism;

Fig. 4 is a longitudinal section of the travel control cylinder used therein; and Fig. 5 is a longitudinal section of the hydraulic cylinder for operating the air or steam valves.

Figure 1:
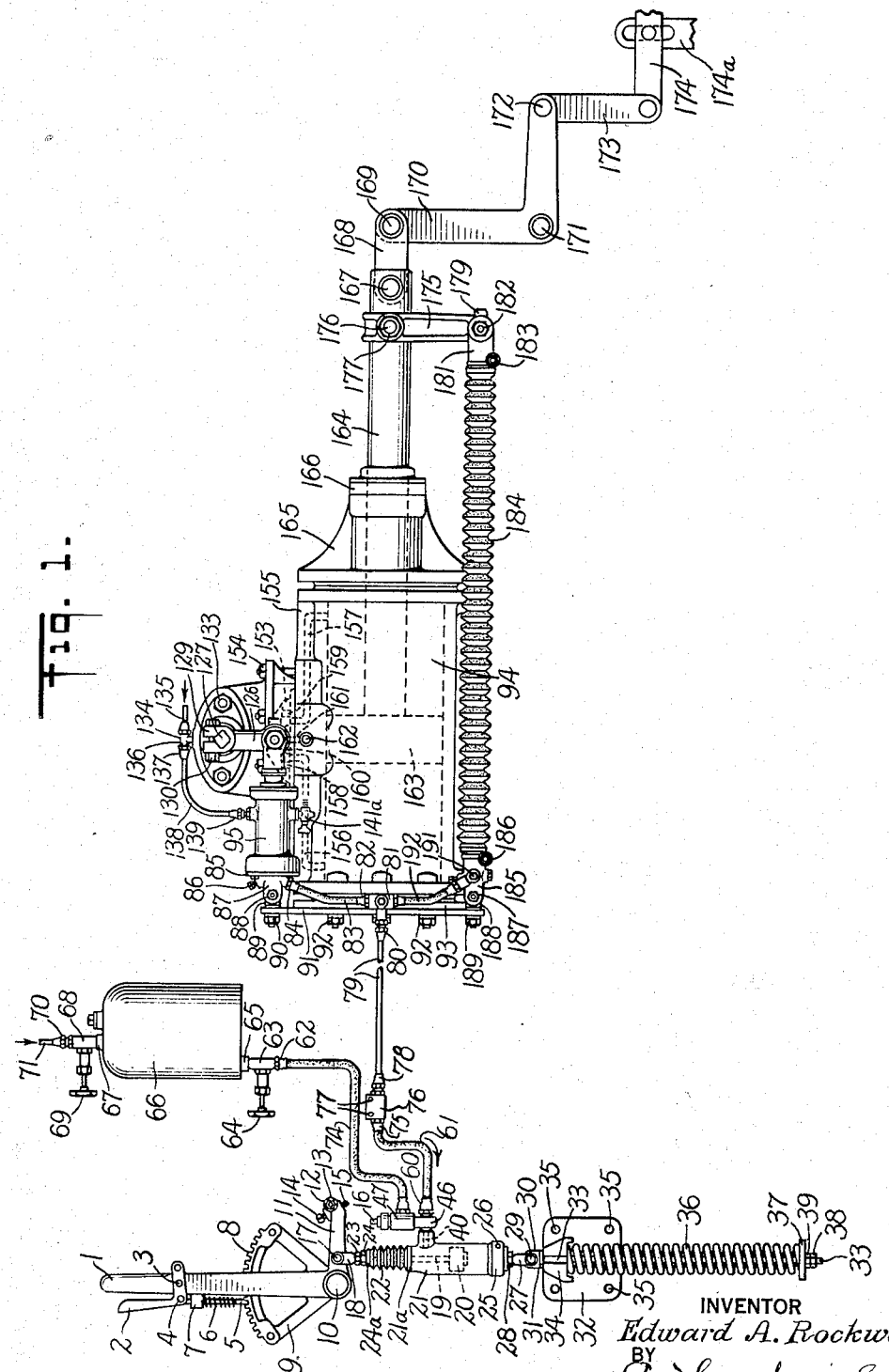
Fig. 1 is a side elevation of a locomotive reverse gear mechanism made in accordance with my invention.

Referring first to the construction shown in Figs. 1 to 5, I have provided an operating handle 1 which may be located in the cab of a locomotive, the same being provided with a subsidiary hand lever 2 pivoted at 3 on the handle 1 and having a pivot 4 connecting it to a rod 5 normally pressed downwardly by a coil spring 6 supported on a lug 7 on the handle 1. The rod 5 acts as a pawl to engage a rack 8 on a sector 9 carried in fixed position at any point in the locomotive cab. The sector 9 has a pivot pin 10 supporting the hand lever 1. Furthermore, the hand lever 1 has an arm 11 provided with a split end 12 adapted to be tightened by a nut 13 so as to lock in place a screw 14 in the end of the arm 11. The screw 14 has an adjustable protruding end 15 which is adapted, in its end position, to contact with the top of a valve rod 16, as hereinafter referred to, for liquid compensation.

The arm 11, furthermore, has a pivot pin 17 intermediate its ends to which there is connected a yoke 18 on a piston rod 19 having a piston 20 operating in a master cylinder 21. The master cylinder 21 is closed at the top by a screw ring cap 21a and has a rubberboot 22 between the upper portion thereof and the piston rod 19, nuts 23 and 24 being provided to attach the boot 22 to the rod 19 by means of a screw-threaded sleeve 24a. The lower end of the master cylinder 21 is provided with a screw cap 25 having an air vent 26 and said cap 25 is screw-threaded to a yoke 27 with the aid of a lock nut 28. Said yoke 27, furthermore, has a pivot pin 29 connecting it to a plate 30 in said yoke having a stop flange 31 overlying a fixed bracket 32, the plate 30 being connected to a spring-retaining rod 33 slidable in a projection 34 on the fixed bracket 32, having holes 35 for securing the fixed bracket 32 on any desired support in the cab of the locomotive. Around the rod 33 there is a coil spring 36 which is supported by a washer 37 and nuts 38 and 39 on the lower end of the rod 33 so as to yield to avoid breakage from the backing up of pressure.

At its upper end the master cylinder 21 has a lateral passageway 40 in which there is screw-threaded a pipe 41 having a longitudinal passageway 42 and transverse apertures 43 and 44 to connect with a longitudinal passageway 45 in a fitting 46 through which the pipe 41 passes. The fitting 46 is screw-threaded to a valve casing 47 and has therein a shoulder 48 for supporting a spring 49 which bears at its upper end against a valve 51 containing an annular rubber valve member 52 which seats against a shoulder 53 on the valve casing 47. A valve stem 50 is connected to the valve rod 16 and the said valve rod 16 passes out of the valve casing 47 through a rubber seal 54 held in place by a washer 55 and a screw cap 56 provided with a packing 57. On the outer end of the pipe 41 there is a nut 58 to hold the valve casing 47 in place and adjacent to the same there is a screw-thread 59 to receive a nipple 60 having thereon a rubber pipe 61.

A reservoir pipe fitting 62 is provided on a hand valve casing 63 provided with a hand valve 64 for shutting off the liquid in the pipe 61 when desired. This hand valve casing 63 is screwed into an outlet opening 65 in the bottom of a reservoir 66 adapted to be filled with hydraulic liquid, oil or any other suitable liquid, to be placed under pressure at the top of the reservoir 66 by compressed air supplied through an inlet opening 67 having a hand valve casing 68 containing a hand valve 69 for cutting off the compressed air when desired. The hand valve casing 68 carries a screw fitting 70 connected to a compressed air supply pipe 71 adapted to be provided from any suitable source, as for example the usual compressed air line of a locomotive. Above the valve 52, 53 there is a port 72, controlled by said valve, containing a screw fitting 73 which is connected to a rubber pipe 74, the other end of which is connected to the fitting 62.

A screw fitting 75, located in a supporting pipe bracket 76 having holes 77 for attachment of the same in a fixed position to some part of the cap, is connected to the rubber pipe 61. The bracket 76, furthermore, has a screw fitting 78 for connecting it to a pressure liquid pipe 79. The pipe 79 is connected by a fitting 80 to a T-pipe joint 81. The pipe joint 81 has a fitting 82 connecting it to a rubber pipe 83 connected by a fitting 84 to a cylinder head 85 having an air bleeder screw 86 of the usual construction. The cylinder head 85, furthermore, has a yoke 87 for connecting it by means of a bolt 88 to a supporting member 89 fastened by means of a nut 90 to a vertical plate 91 having screwed thereto the T-pipe joint 81 which is secured by screws 92 to a cylinder head 93 of a compressed air cylinder 94.

The pressure liquid which is conveyed by the pipe 83 to the cylinder head 85 enters a valve controlling cylinder 95 attached to the head 85 by screws 96. On its interior the cylinder head 85 has a screw-threaded split ring 97 for fastening it, by means of a bolt 98, to a screw-threaded cylinder 99 provided on its inner end with an annular screw head 100. Against the screw head 100 there is a rubber seal 101 held in place by an annular ring 102 fitting against a bushing 103 having longitudinal peripheral oil passageways 104. Outside of the screw-threaded cylinder 99 there is located an intermediate cylinder 105 having a piston 106 thereon. Adjacent to the piston 106 there are a series of rubber packing rings 107 and a retainer ring 108 held in place by a split ring 109 on the intermediate cylinder 105. The other end of this intermediate cylinder 105 passes out through a forward cylinder head 110 connected to the cylinder 95 by screws 111. Adjacent to the cylinder head 110 there are a series of rubber packing rings 112 held in place by a ring 113 and a split ring 114. The forward end of the intermediate cylinder 105 is provided with a breather opening 114a and is screw-threaded in a split ring end 115 of a pivot bracket 116 held in place by a bolt 117. Furthermore, adjacent the end of the intermediate cylinder 105 there is a ring 118 for holding in place a retainer ring 119 located in a recess 120 on a head 121 of a piston rod 122, the surface of which is ground to be perfectly cylindrical. The ring 119 has clearances on all sides of it to permit self alignment of the piston 122. The pivot bracket 116 has a bushing 123 and an oil opening 124 normally closed by a plug 125 for connecting the bracket 116 to a rocker arm 126 which is fastened on a squared end 127 of a rocker shaft 128, the rocker arm 126 having a split end 129 and bolt 130 for this purpose. The rocker shaft 128 passes through a valve chest gland 131 secured to a rocker housing 132 by screws 133. At its top the housing 132 has a T-shaped inlet pipe 134 provided with a branch pipe 135 for connection to any suitable source of supply of compressed air or steam, as for instance the usual compressed air line of the locomotive, and a branch 136 connected by a fitting 137 to a pipe 138 having a screw fitting 139 which is connected to an inlet opening 140 in the cylinder 95 to communicate with an annular chamber 141 for returning the piston 106 by compressed air. The annular chamber 141 may, also, be provided with a water draw-off cock 141a in case steam is used instead of compressed air.

The rocker shaft 128 has thereon a bushing 142 supporting it within the rocker housing 132 and adjacent to the said bushing 142 there is a ring 143 which abuts against a rocker 144 held in place on a screw-threaded squared end 145 of the rocker shaft 128 by a nut 146. The rocker 144 has two arms 147 and 148 which carry vertical slots 149 and 150 to cooperate with a rocker trunnion 151 passing through a rocker trunnion block 152 which is secured to a sliding valve member 153. It will be noted that the rocker housing 132 is connected by bolts 154 to the top of the air cylinder 94 above a flat extension 155 on the latter, in which there are located a rearwardly directed angular passageway 156 leading to the rear of the cylinder 94 and a similar passageway 157 leading to the front of said cylinder. The sliding valve member 153 has two aperatures 158 and 159 to connect alternately with the passageways 156 and 157 so as to convey thereto or therefrom the compressed air or steam admitted from the pipe 135 to the interior of the rocker housing 132, which thus serves as an air or steam chest for this purpose. It will be noted, also, that the said plate 153 has on the under-face thereof a chamber 160 which is adapted to convey away the exhaust from either of the pipes 156 and 157 when brought into registry therewith, the exhaust being carried away by a passageway 161 leading to an exhaust port 162.

The compressed air thus admitted to either of the ends of the air cylinder 94 acts upon a piston 163 connected to a piston rod 164 which passes out through a cylinder head 165 having the usual packing gland 166. The said piston rod 164 has as its end a pivot 167 for connecting it to a reach-rod 168 having a pivotal connection 169 to a bell crank lever 170 carried on a fixed pivot 171 which in turn has a pivotal connection 172 to a lifting link 173 connected in the usual way to a radius rod 174 adapted to drive the locomotive in opposite directions by being moved into different positions for operating a locomotive reverse gear 174a of any desired type but which may be, for example, any of the locomotive reverse gears as set forth in Marks Mechanical Engineers Handbook, first edition, 1916, pages 975 to 977, published by McGraw-Hill Book Company, Inc., New York.

Furthermore, the said piston rod 164 may have attached to the side thereof a diagonal arm 175 which is secured thereto by a bolt 176 and nut 177. The lower end of the diagonal rod 175 has at its end 178 a cylindrical rod 179 carried within a bifurcated end 180 of a sleeve clamp 181 provided with a fastening screw 182 in said bifurcated end and a fastening bolt 183 in the split end thereof. A long rubber boot 184 is attached to the clamp 181 at one end and is attached at its other end to a similar clamp 185 having a screw 186 at its split end and a screw 187 at its bifurcated end, the said bifurcated end being connected by means of the screw 187 and a supporting bracket 188 provided with a screw 189, from the vertical plate 91. This clamp 185, however, has an inlet port 190 provided with a fitting 191 connected by a rubber pipe 192 to the T-pipe joint 81. The clamp 185 also has an air bleeder screw 193. As will be noted from Fig. 4, the said clamp 185 has a cylinder 194 screw-threaded into the same, which has at its innermost end an annular screw-threaded head 195, adjacent to which there is a rubber seal 196 and an annular retaining ring 197 adjacent to a bushing 198. This cylinder 194 slides within an outer cylinder 199 which is screw-threaded in the clamp 181, a breather opening 200 being provided in said outer cylinder. Furthermore, the foremost end of the outer cylinder 199 abuts against a ring 201 so as to hold in place a ring 202 located in a recess 203 in a plunger 204, the surface of which is ground to be perfectly cylindrical. The ring 202 has clearances on all sides thereof to permit self alignment of the plunger 204. This plunger 204 serves to coordinate the travel of the manual lever 1 with the rocker lever 126.

In the operation of my invention, the hand lever 1 is shown in Fig. 1 in the middle position while the locomotive is at rest. When it is desired to operate the locomotive forwardly the hand lever 1 is moved to the right, thereupon withdrawing liquid from the cylinder 95 so as to permit the piston 106 to move to the left in Fig. 5, which is followed by the entry of compressed air or steam into the chamber 141 at the rear of said piston 106. This accordingly shifts the position of the radius rod 174 into the position, in the reverse gear, which will drive the locomotive forwardly. This is accomplished by the movement of the rocker lever 126 to the left, which accordingly moves the valve member 153 to the left so as to bring the passageway 159 in communication with the passage 157, thus supplying air or steam to the right of the piston 163, which accordingly moves to the left while the left end of the cylinder 94 is exhausted through the passageway 156 and port 162. In the operation of the hand lever 1 in this way the position of the hand lever 1 will always be coordinated in travel to the radius rod 174, and, therefore, the reverse gear mechanism, owing to the plunger 204 moving within the cylinder 194 as the latter is connected by the pipe 192 to the master cylinder 21. Furthermore, upon the extreme forward movement of the hand lever 1 the hand lever 1 and the radius rod 174 will be brought into phase each time by the opening of the valve 52, 53, due to the contact of the screw end 15 with the valve rod 16 and the readjustment in the system of the hydraulic liquid or oil received from the reservoir 66 under the influence of the compressed air supplied through the pipe 71, resulting in passing compensating liquid from the reservoir 66 to the system or in the opposite direction, according to the expansion or contraction of the liquid. When the locomotive is to be driven rearwardly the hand lever is moved to the left of the middle position, shown in Fig. 1, whereupon the liquid in the master cylinder 21 will be pressed into the cylinder 95 while the spring 36 is compressed somewhat to avoid undue acceleration, thus moving the rocker lever 126 in the opposite direction to that previously described and, accordingly, conveying the air or steam through the port 158 and passageway 156 to the forward end of the cylinder 94 while simultaneously exhausting the rear end of the cylinder 94 through the passageway 157 and the port 162. Also, during this movement, likewise, the travel of the hand lever 1 and radius rod 174 are coordinated in the same way. Thus, in either direction of drive of the locomotive the engineer will always know the extent of the movement of the radius rod 174 by the position of the hand lever 1 and, accordingly, is enabled to control the forward or rearward movement of the locomotive with the greatest degree of precision. Also, the operation of the locomotive in this way takes place with the utmost smoothness and with a minimum of manual effort.

While I have described my invention above in detail I wish it to be understood that many changes may be made therein without departing from the spirit of the same.

I claim:

1. In combination, a hydraulic cylinder, a piston movably supported with regard thereto, located within but spaced from said cylinder, a seal closing one end of the cylinder, having a bushing, with a longitudinal peripheral passage, on one side and a cylinder head on the other side thereof, located between the piston and cylinder, an enclosing sleeve, having a fluid-operated piston connected thereto, movable relatively to said cylinder, and an enclosing casing, having a fluid inlet port, for the fluid-operated piston.

2. In combination, a hydraulic cylinder, a piston movably supported with regard thereto, said piston being located within but spaced from said cylinder, a seal located between the piston and cylinder, and a head for said piston having a self-aligning laterally movable connection therewith enabling said piston to be movable laterally in all directions with regard to said head.

3. In combination, a hydraulic cylinder, a piston movably supported with regard thereto, said piston being located within but spaced from said cylinder, a seal located between the piston and cylinder, and a head for said piston, said head being located outside of said cylinder, having a self-aligning laterally movable connection therewith comprising a loosely-fitting retaining member between the piston and head and laterally movable with regard to said head.

4. In a hydraulic cylinder having a plunger located in but spaced from said cylinder, means for operating the plunger, a movable cylindrical enclosure for the plunger capable of movement when the plunger is moved, a ring supporting the plunger from the cylinder, a fluted bushing for supporting said ring, an inlet and outlet passageway for the liquid moved by the plunger through the passageway, and a pivoted bracket having a self-aligning laterally displaceable ring for connection to said plunger by means of said ring outside of said cylinder.

5. In a hydraulic cylinder having a plunger located in but spaced from said cylinder, means for operating the plunger, a movable cylindrical enclosure for the plunger capable of movement when the plunger is moved, a seal contacting with the cylinder and plunger, and an inlet and outlet passageway for the liquid to move the plunger, said cylinder having a pivotal connection with a fixed support and said cylindrical enclosure being provided with a pivoted bracket having a self-aligning connection to said plunger outside said cylinder.

6. In a hydraulic cylinder having a plunger located in but spaced from said cylinder, means for operating the plunger, a movable cylindrical enclosure for the plunger capable of movement when the plunger is moved, a seal contacting with the cylinder and plunger, and an inlet and outlet passageway for the liquid to move the plunger, said passageway having a flexible pipe connection with a fixed conduit and said cylindrical enclosure being provided with a pivoted bracket having a self-aligning connection to said plunger outside said cylinder.

7. In a hydraulic cylinder having a plunger located in but spaced from said cylinder, means for operating the plunger, a movable cylindrical enclosure for the plunger capable of movement when the plunger is moved, a seal contacting with the cylinder and plunger, and an inlet and outlet passageway for the liquid to move the plunger, said cylinder having a pivotal connection with a fixed support, said passageway having a flexible pipe connection with a fixed conduit, and said cylindrical enclosure being provided with a pivoted bracket having a self-aligning connection to said plunger outside said cylinder.

8. In combination, a hydraulic cylinder, a valve-operating piston movably supported with regard thereto controlling the admission of a pressure fluid for work performance, located within but spaced from said cylinder, a seal, having a bushing on one side and a cylinder head on the other side thereof, located between the piston and cylinder, an enclosing sleeve, having a fluid-operated piston connected thereto, movable relatively to said cylinder, an enclosing casing, having a fluid inlet port for receiving a manually controlled liquid, for operating the fluid-operated piston, a second hydraulic cylinder, a second piston movably supported with regard thereto moved according to the admission of said pressure fluid, located within but spaced from said second cylinder, a second seal, having a bushing on one side and a second cylinder head on the other side thereof located between the second piston and the second cylinder, a second enclosing sleeve movable relatively to said second cylinder, supporting heads for said second hydraulic cylinder and second sleeve respectively, a fixed support having pivotal connections, respectively, to said first and second hydraulic cylinders, and a hydraulic inlet pipe mounted on said support having hydraulic connections to said first and second hydraulic cylinders, respectively.

9. In combination, a hydraulic cylinder, a valve-operating piston movably supported with regard thereto controlling the admission of a pressure fluid for work performance, located within but spaced from said cylinder, a seal, having a bushing on one side and a cylinder head on the other side thereof, located between the piston and cylinder, an enclosing sleeve, having a fluid-operated piston connected thereto, movable relatively to said cylinder, an enclosing casing, having a fluid inlet port for receiving a manually controlled liquid, for operating the fluid-operated piston, a second hydraulic cylinder, a second piston movably supported with regard thereto moved according to the admission of said pressure fluid, located within but spaced from said second cylinder, a second seal, having a bushing on one side and a second cylinder head on the other side thereof located between the second piston and the second cylinder, a second enclosing sleeve movable relatively to said second cylinder, supporting heads for said second hydraulic cylinder and second sleeve respectively, a fixed support having pivotal connections, respectively, to said first and second hydraulic cylinders, and a hydraulic inlet pipe, having a T-joint, mounted on said support having flexible hydraulic connections to said first and second hydraulic cylinders respectively.

10. In combination, a hydraulic cylinder, a valve-operating piston movably supported with regard thereto controlling the admission of a pressure fluid for work performance, located within but spaced from said cylinder, an enclosing sleeve, having a fluid-operated piston connected thereto, movable relatively to said cylinder, an enclosing casing, having a fluid inlet port for receiving a manually controlled liquid, for operating the fluid-operated piston, a second hydraulic cylinder, a second piston movably supported with regard thereto moved according to the admission of said pressure fluid, located within but spaced from said second cylinder, a second enclosing sleeve movable relatively to said second cylinder, supporting heads for said second hydraulic cylinder and second sleeve respectively, a fixed support having pivotal connections, respectively, to said first and second hydraulic cylinders, and a hydraulic inlet pipe mounted on said support having hydraulic connections to said first and second hydraulic cylinders respectively, said first and second enclosing sleeves having connecting means located therebetween coordinating the movements of said enclosing sleeves.

11. In combination, a hydraulic cylinder, a valve-operating piston movably supported with regard thereto controlling the admission of a pressure fluid for work performance, located within but spaced from said cylinder, an enclosing sleeve, having a fluid-operated piston connected thereto, movable relatively to said cylinder, an enclosing casing, having a fluid inlet port for receiving a manually controlled liquid, for operating the fluid-operated piston, a second hydraulic cylinder, a second piston movably supported with regard thereto moved according to the admission of said pressure fluid, located within but spaced from said second cylinder, a second enclosing sleeve movable relatively to said second cylinder, supporting heads for said second hydraulic cylinder and second sleeve respectively, a fixed support having pivotal connections, respectively to said first and second hydraulic cylinders, and a hydraulic inlet pipe, having a T-joint, mounted on said support having flexible hydraulic connections to said first and second hydraulic cylinders respectively, said first and second enclosing sleeves having connecting means located therebetween coordinating the movements of said enclosing sleeves.

EDWARD A. ROCKWELL.

REFERENCES CITED

The following references are of record in the file of this patent:

UNITED STATES PATENTS

| Number | Name | Date |
| --- | --- | --- |
| 1,491,797 | Harrison | Apr. 29, 1924 |
| 1,525,447 | Hose | Feb. 10, 1925 |
| 1,635,331 | Krisch | July 12, 1927 |
| 1,690,037 | Pedersen | Oct. 30, 1928 |
| 1,700,894 | Joyce | Feb. 5, 1929 |
| 1,876,023 | Rosenberry | Sept. 6, 1932 |
| 1,884,022 | Lunati | Oct. 25, 1932 |
| 1,927,078 | Weeks | Sept. 19, 1933 |
| 1,928,465 | Schultz | Sept. 26, 1933 |
| 1,974,556 | Ainsworth | Sept. 25, 1934 |
| 1,996,444 | Tatter | Apr. 2, 1935 |
| 2,018,325 | Schnell | Oct. 22, 1935 |
| 2,161,659 | Shepard | June 6, 1939 |
| 2,204,365 | Klemm | June 11, 1940 |
| 2,208,620 | Baisch | July 23, 1940 |
| 2,292,916 | Wheelon | Aug. 11, 1942 |

FOREIGN PATENTS

| Number | Country | Date |
| --- | --- | --- |
| 87 | Great Britain | Jan. 10, 1863 |
| 419,309 | Great Britain | Nov. 9, 1934 |
| 83,613 | France | Dec. 16, 1868 |